United States Patent [19]

Hayashi

[11] Patent Number: 5,454,907
[45] Date of Patent: Oct. 3, 1995

[54] METHOD OF REFINING WOODCHIPS OR BEATING WOOD PULP WITH A SELECTIVELY SULFONATED CHITOSAN

[75] Inventor: Jisuke Hayashi, Sapporo, Japan

[73] Assignee: Japan PMC Corporation, Tokyo, Japan

[21] Appl. No.: 196,807

[22] Filed: Feb. 15, 1994

Related U.S. Application Data

[63] Continuation of Ser. No. 22,592, Feb. 17, 1993, abandoned, which is a continuation of Ser. No. 812,020, Dec. 23, 1991, abandoned.

[30] Foreign Application Priority Data

Dec. 25, 1990 [JP] Japan .................................. 2-412998

[51] Int. Cl.$^6$ ............................................. D21B 1/16
[52] U.S. Cl. ................................ 162/26; 162/28; 162/82
[58] Field of Search ................................. 162/175, 178, 162/9, 26, 82, 28

[56] References Cited

U.S. PATENT DOCUMENTS 4,102,738  7/1978  Dzurik ..................................... 162/175
5,229,504  7/1993  Hayashi .

FOREIGN PATENT DOCUMENTS 02240101  9/1990  Japan .

OTHER PUBLICATIONS

Rydholm "Pulping Processes"; Interscience Publishing; New York, Sep. 1967, pp. 424–425.
Abstract Bulletin of the Institute of Paper Chemistry, vol. 62, No. 6, Dec. 1991, Appleton US, p. 653; Nicol, S.: "Life after death for empty shells", Abstract No. 6602.
Abstract Bulletin of the Institute of Paper Chemistry, vol. 49, No. 11, May 1979, Appleton US, p. 1045; Allan, G. G. et al.: "Chitosan–mediator for fiber–water interactions in paper", abstract No. 9641.
Patent Abstracts of Japan, vol. 014, No. 559 (C–0787) 12 Dec. 1990 & JP–A–02 240 101 (Lion Corp.) 25 Sep. 1990.
Wolfrom, M. L., et al, JACS 81, 1764 (1959), "The Sulfonation of Chitosan".

*Primary Examiner*—Steve Alvo
*Attorney, Agent, or Firm*—Stevens, Davis, Miller & Mosher

[57] ABSTRACT

A refining assisting agent comprising sulfonated chitosan has been provided. With the addition of the sulfonated chitosan according to the present invention, power needed in the refining can be remarkably reduced compared with that needed in the conventional refining. In addition, the refining assisting additive improves paper strength.

3 Claims, No Drawings

METHOD OF REFINING WOODCHIPS OR BEATING WOOD PULP WITH A SELECTIVELY SULFONATED CHITOSAN

This application is a continuation of application Ser. No. 08/022,592, filed Feb. 17, 1993, now abandoned, which in turn is a continuation of application Ser. No. 07/812,020, filed Dec. 23, 1991, now abandoned.

FIELD OF THE INVENTION

This invention relates to a novel refining assisting agent useful in refining wood chips or beating pulps and a refining method using the same.

BACKGROUND OF THE INVENTION

Recently high-yield pulps have come to be commonly used as a main material for newsprint paper, magazine paper and low-grade printing paper. Typical examples of the high-yield pulp are refiner groundwood pulp (RGP) prepared by refining softwood chips with a disc refiner, thermomechanical pulp (TMP) prepared by treating heat-softened softwood chips with a disc refiner under a pressurized condition, chemiground pulp (CGP) and semichemical pulp (SCP) prepared by refining hardwood chips with a disc refiner after they are treated with sodium hydroxide or sodium sulfite.

These high-yield pulps have a problem that they are mechanically refined with a disc refiner in their preparation and demand more electric power than chemical pulps (CP), which is the most impedimental problem involved in the use of high-yield pulps. In the case of CP as well, beating of the pulp with a refiner is also normally carried out prior to the papermaking step for accelerating the swelling of the fibers and enhancing the bonding strength between the fibers. Here consumption of a large amount of energy is also a problem to be solved.

Studies in search of the additives useful for reducing power consumption in refining or beating of pulp have been conducted from the viewpoint of energy-saving. One of such studies, for instance, proposed direct addition of a dye Congo Red to the pulp, which remarkably reduces the power consumption in the beating. The use of Congo Red, however, is impracticable since it dyes the pulp red.

SUMMARY OF THE INVENTION

The main object of the present invention is to provide a novel refining assisting agent and a refining method using the same useful for reducing the power consumption in the production of high-yield pulp and in the beating of the pulp and consequently contributing to the energy saving as well as for enhancing the paper strength.

We have conducted extensive studies to solve the above-described problems, found that the use of a sulfonated chitosan having amino groups and sulfon groups as a refining assisting agent reduces the power consumption in the refining and beating of the pulp as well as enhances the paper strength of the obtained paper, and thus completed the present invention.

Accordingly, the present invention provides an agent comprising sulfonated-chitosan which assists the refining of wood chips or pulp and a refining method using the same.

DETAILED DESCRIPTION OF THE INVENTION

Details of the present invention will be made clear by the following description.

In the present invention, the term "refining (in a wide sense) assisting agent" means an agent which assists the mechanical refining (in a narrow sense) of wood chips in the preparation of high-yield pulps or assists the beating of pulps. The high-yield pulp is a pulp the preparation of which involves mechanical refining of wood chips with a disc refiner and exemplified by the above-mentioned RGP, TMP, CGP, SCP and the like. The pulp to be beaten is a pulp which is beaten before being made into paper and exemplified by the above-mentioned high-yield pulp, the chemical pulp (CP) such as sulfite pulp (SP), Kraft pulp (KP), soda pulp (AP) and the like.

Sulfonated chitosan useful as a refining assisting agent in the refining or beating in accordance with the present invention is obtained by sulfonating chitosan which is obtained by deacetylating chitin contained in crustacean animals such as crabs, lobsters and insects, fungi and the like. Conventional processes of sulfonating chitosan are described, for instance, in M. I., Wolfrom, T. M. Shen. Han, JACS 81, 1764 (1959). Sulfonated chitosan prepared by such conventional processes can be used but these processes involve a problem that sulfonation occurs at not only C3/C6 positions of chitosan but partially on the C2 amino group, which hinders the amino group from being cationized.

In view of this fact, the following sulfonating process is preferred, which enables the selective sulfonation of the C3/C6 positions and does not impair the amino functionality of the chitosan. That is, it is preferred that the chitosan is subjected to the below-described pretreatment and then to a selective sulfonation at the C3/C6 positions using a sulfonating agent of $SO_3$-DMF complex or $ClHSO_3$-DMF complex in a non-polar solvent.

In the above-mentioned preferred process, a pretreatment comprising the following steps must be effected:

(1) Dissolving chitosan in an acetic acid solution having a concentration of 1–2% or swelling chitosan to a large or extreme extent in an acetic acid solution having a concentration of 1–2%.

(2) Regenerating chitosan with an alkaline aqueous solution.

Ordinary alkalis such as NaOH, $Na_2CO_3$, KOH are usable in this step. NaOH is the most preferable. The regeneration of dissolved chitosan can be effected by neutralization-precipitation and the regeneration of swollen chitosan can be effected by "deswelling" or removing the excess liquid therefrom.

(3) Washing the thus regenerated chitosan with water and then with alcohol.

Suitable alcohols include methanol, ethanol and the like.

(4) Immersing the washed chitosan in a polar solvent and pressing the solvent out of the same to replace the alcohol with a specific polar solvent.

Polar solvents suitable for this purpose include dimethylformamide (DMF) and dimethyl sulfoxide (DMSO).

The foregoing pretreatment enables the subsequent sulfonating step to proceed like a homogeneous phase reaction though it is, in fact, substantially a heterogeneous phase reaction.

Without the above-described pretreatment, the heterogeneous-phase sulfonation reaction using a solvent such as benzene and toluene, which does not dissolve the reaction product (sulfonated chitosan) proceeds from the surface of the solid and gives water-soluble sulfonated chitosan of only a few % of the starting material even after 24 hour reaction. In contrast, when chitosan has been subjected to the pretreatment prior to the heterogeneous-phase sulfonation reaction, sulfonated chitosan can be obtained in an about 100% yield by one-hour reaction at room temperature.

Furthermore, this pretreatment provides another effect that the quaternized amino groups remain unchanged after they undergo a neutralization step and the amino groups are protected from sulfonation, which enables the selective sulfonation of the C3/C6-position hydroxyl groups and eliminates the necessity of recovering of amino groups by desulfonation.

Sulfonation can be effected by using $SO_3$-DMF complex or $ClHSO_3$-DMF complex as a sulfonating agent and a nonpolar solvent as a solvent, at a temperature of 0°–100° C., preferably 5°–80° C., for 0.1–48 hours under agitation.

Further selectivity in the reaction (i.e. selective sulfonation only at the C6-position or sulfonation wherein the C3/C6-positions are sulfonated in a desired ratio) can be attained by selecting these reaction conditions.

That is, we found that the selective reaction at the C6-position can be attained by conducting the reaction at a relatively high temperature and a reaction at a relatively low temperature for a long time improves the sulfonation degree at the C3-position.

$SO_3$-DMF complex can be prepared by allowing $SO_3$ to be absorbed and dissolved in DMF. $ClHSO_3$-DMF complex can be prepared by dropwise addition of chlorosulfonic acid ($ClHSO_3$) to DMF.

Preferable non-polar solvents are aromatic solvents, benzene or toluene being most preferred.

In the sulfonation step of this process, hydroxyl groups at the C3/C6-positions are selectively sulfonated. Since the produced water-soluble sulfonated chitosan does not dissolve in a non-polar solvent such as benzene, it can be separated by filtration. Furthermore, since the reaction does not involve formation of sodium sulfonate, washing of sulfonated chitosan can be easily effected by a small amount of methanol.

In addition, the filtrate can be recycled by replenishing $SO_3$ or $ClHSO_3$ to form DMF-complex. Thus the process reduces the amount of DMF, methanol and sulfonating agents used in the process and, therefore, brings about economical advantages.

A filtration step follows the sulfonation step and the filtrate comprising the unreacted sulfonating agent, polar and non-polar solvents is recycled and the residue comprising sulfonated chitosan (object compound) and a slight amount (not more than 1%) of the unreacted chitosan is washed with methanol or the like and redissolved in water to remove the unreacted chitosan (water-insoluble) and then purified by way of precipitation from acetone or lyophilization to give the product (sulfonated chitosan).

Since the separation and refining steps of the above-described process are remarkably simple, they require less amount of solvents than those of the conventional process and improve the economical efficiency of the total process.

The sulfonated chitosan obtained by the above-described process is added solely or in combination with other additives in the form of dry powder or in a solution, for example, to the wood chips at the refining step with a disc refiner, or to the pulp slurry at the beating step before the papermaking step. The sulfonated chitosan is suitably used in an amount of 0.01–2% based on the bone-dry weight of the chips or the pulp. This addition of sulfonated chitosan enables power consumption to be remarkably reduced in the refining or beating step.

Depending on cases, other additives conventionally used in papermaking such as filers, aluminum sulfate, sizing agents, dry strength resins, wet strength resins, retention aids, drainage aids or dyes may be added to the pulp obtained with the use of sulfonated chitosan to produce various types of paper or paperboard. If necessary, starch, polyvinyl alcohol, dyes, coating colors, surface sizing agents, anti-slipping agents or the like may be applied by using a size press, a gate roll coater, a bill blade coater, a calender or the like. Examples of papers to which the present invention is applicable include coat base paper, printing or writing paper, information paper, medium grade (i.e. ground wood containing) printing paper, wrapping paper, sanitary paper, newsprint paper and the like. Examples of paperboards include liner, corrugating medium, white board, gypsum liner board and the like. These papers or paperboards made from the pulp obtained with the use of sulfonated chitosan in accordance with the present invention exhibit excellent paper strength.

EXAMPLES

Now the invention will be illustrated by way of referential, comparative referential and working examples. The below-described referential examples relate to the preparation of sulfonated chitosan wherein the C3/C6-positions are selectively sulfonated. These examples should be taken as illustrative and not in a limiting sense.

Referential Example 1

Preparation of chitosan-3,6-sulfate
Pretreatment of chitosan

Chitosan (a commercial product supplied by Tokyo Kasei Kogyo Kabushiki Kaisha) was treated with a 40% NaOH solution for four hours at 95° C. and a purified chitosan (degree of deacetylation: 87.2%) was obtained after two-cycle repetition of filtration and neutralization. 5 g of the purified chitosan was dissolved in 20 g of a 2% aqueous solution of acetic acid and precipitated by neutralization with a 2% NaOH aqueous solution under agitation. The regenerated chitosan was washed with water and then with methanol and thereafter immersed in DMF for 3 hours and pressed. Thus a pretreated chitosan was obtained.
Preparation of sulfonating agent 24.5 g of $SO_3$ was dissolved in 22.4g of DMF to form 46.9 g of $SO_3$-DMF complex.
Synthesis of sulfonated chitosan 46.9g of $SO_3$-DMF complex (above-described) was dissolved in 200 g of benzene. The total amount of the pretreated chitosan was added to the solution and the solution was stirred for 1 hour at room temperature. The settling was separated by filtration, washed with a small amount of methanol, dissolved in water and filtered. The filtrate is lyophilized and 8.3 g of sulfonated chitosan was obtained. The degree of sulfonation was determined to be 1.12 (substitution degree) by elemental analysis and the yield based on chitosan was 98.4%.

It is confirmed by IR and $^{13}C$-NMR that the obtained sulfonated chitosan is chitosan-3,6-sulfate wherein the C3 and C6-position hydroxyl groups are selectively and partially sulfonated and the C2-position $NH_2$ group is not sulfonated.

Referential Example 2

Preparation of chitosan-3,6-sulfate hydrolysate

Two grams of chitosan-3,6-sulfate obtained in the Referential Example 1 was dissolved in 300 ml of 0.1N sulfuric acid aqueous solution. The solution was heated to 80° C. for an hour to hydrolyze the chitosan-3,6-sulfate. Then the solution was neutralized in an ice bath with 30 ml of a cooled 1N NaOH aqueous solution of 10° C., subjected to dialysis to remove the formed salt, concentrated at 40° C. under reduced pressure and lyophilized to give 1.6 g of chitosan-3,6-sulfate hydrolysate.

Referential Example 3

Preparation of chitosan-6-sulfate
Pretreatment of chitosan

Pretreated chitosan was obtained in the same manner as in Referential Example 1.
Preparation of sulfonating agent 35.7g of chlorosulfonic acid was added dropwise in 22.4 g of DMF below 40° C. to form 58.1 g of ClHSO$_3$-DMF complex.
Synthesis of sulfonated chitosan 58.1 g of ClHSO$_3$-DMF complex (above-described) was dissolved in 200 g of benzene. The total amount of the pretreated chitosan was added to the solution and stirred for 3 hours at 50° C. The settling was separated by filtration, washed with a small amount of methanol, dissolved in water and filtered. The filtrate was lyophilized and 7.68 g of sulfonated chitosan was obtained. The degree of sulfonation was determined to be 0.88 (substitution degree) by elemental analysis and the yield based on chitosan was 99.5%.

It is confirmed by IR and $^{13}$C-NMR that the obtained sulfonated chitosan is chitosan-6-sulfate wherein the C6-position hydroxyl group is selectively and partially sulfonated and the the C3-position hydroxyl group and C2-position NH$_2$ group are not sulfonated.

Referential Example 4

Preparation of chitosan-6-sulfate hydrolysate

Chitosan-6-sulfate hydrolysate was obtained by repeating the process of Referential Example 2 except that chitosan-6-sulfate obtained in Referential Example 3 was used.

Referential Comparative Example

Preparation of chitosan-N,3,6-sulfate wherein C3 and C6-position hydroxyl groups as well as C2-position amino group are sulfonated Pretreatment of chitosan Chitosan (a commercial product supplied by Tokyo Kasei Kogyo Kabushiki Kaisha) was treated with a 40% NaOH solution for four hours at 95° C. and a purified chitosan (degree of deacetylation: 87.2%) was obtained after two-cycle repetition of filtration and neutralization. 5 g of the purified chitosan was soaked in 100 ml of DMF at room temperature for 24 hours and thereafter pressed to remove the liquid so that the total weight was 10 g. The chitosan was then subjected to the sulfonating treatment.
Preparation of sulfonating agent 24.5 g of SO$_3$ was dissolved in 22.4 g of DMF to form 46.9 g of SO$_3$-DMF complex.
Synthesis of sulfonated chitosan 46.9 g of SO$_3$-DMF complex (above-described) was dissolved in 200 g of DMF. The total amount of the pretreated chitosan (above-described) was added to the solution and stirred for 1 hour at room temperature. 240 g of methanol and 80 g of 10N NaOH were added thereto and the settling was separated by filtration, washed with a large amount of methanol, dissolved in water and filtered. The filtrate was subjected to dialysis to remove sodium sulfate and methanol, concentrated and lyophilized and 5.7 g of sulfonated chitosan was obtained. The degree of sulfonation was determined to be 1.17 (substitution degree) by elemental analysis and the yield calculated therefrom was 66.4%.

It is confirmed by IR and $^{13}$C-NMR that the obtained sulfonated chitosan is chitosan-N,3,6-sulfate wherein the not only C3 and C6-position hydroxyl groups but also the C2-position NH$_2$ group are partially sulfonated.

Example 1

Refining assisting effect of sulfonated chitosan

Samples of water-containing unbeaten and bleached softwood Kraft pulp provided from a paper mill were taken so that the bone-dry weight thereof might be 15 g and water was added thereto to adjust the pulp concentration to be 15%. Sulfonated chitosans of the above Referential Examples 1–4 and Referential Comparative Example and Congo Red (comparative example) were respectively added thereto in an amount of 1% based on the pulp weight. The thus prepared pulps were beaten with a PFI mill under the following conditions:

Temperature: 20° C.
Beating pressure: 1.8 Skg/cm$^2$
Clearance: 0.4 mm.

When the rotation number reached the predetermined value, the pulp was taken out of the mill and the freeness thereof was measured by using the Canadian standard freeness tester. A control pulp without additives was also beaten with a PFI mill in the same manner except that no additives were used and the freeness thereof was measured. The results are summarized in Table 1.

As is shown in Table 1, chitosan-3,6-sulfonate hydrolysate exhibits the most excellent refining assisting effect. The freeness achieved by 6,000 rotations with the use thereof is almost equivalent to that by 8,000 rotations with no additives. In the case that amino groups are sulfonated (Comparative Referential Example), only little improvement in the refining assisting effect was observed in comparison with the case where no additives were used.

TABLE 1

Refining Assisting Effect of Sulfonated Chitosan

| No. | Additive | Freeness (ml) Rotation Number of PFI Mill | | |
|---|---|---|---|---|
| | | 4000 | 6000 | 8000 |
| 1 | No additive[1] | 580 | 470 | 370 |
| 2 | Congo Red[2] | 490 | 375 | 285 |
| 3 | C-N,3,6-S[3] | 560 | 460 | 370 |
| 4 | C-3,6-S[4] | 520 | 420 | 340 |
| 5 | C-3,6-S(h)[5] | 510 | 380 | 290 |
| 6 | C-6-S[6] | 535 | 435 | 360 |
| 7 | C-6-S(h)[7] | 520 | 410 | 320 |

NOTES:
1) Control
2) Comparative Example
3) Chitosan-N,3,6-sulfate (Referential Comp. Ex.)
4) Chitosan-3,6-sulfate (Product of Ref. Ex. 1)
5) Chitosan-3,6-sulfate hydrolysate (Product of Ref. Ex. 2)
6) Chitosan-6-sulfate (Product of Ref. Ex. 3)
7) Chitosan-6-sulfate hydrolysate (Product of Ref. Ex. 4)

Example 2

Paper strength improving effect of sulfonated chitosan

A beaten pulp having a freeness of around 370 ml was selected from the pulp obtained in Example 1 and each of them was taken so as to contain 6 g of pulp in bone-dry weight. Each sample was macerated for 10 minutes with 1.5 litters of water. Water was added thereto to make the total volume 2 litters and the mixture was made into paper having a basis weight of 60.0±1.0 g/m$^2$ at pH 6.2. The papermaking was carried out in accordance with the TAPPI standard method by using a standard cylinder paper machine followed by wet pressing of 5 min-3.9 kg/cm$^2$ and 2 min-3.5 kg/cm$^2$. The thus obtained paper was subjected to humidity conditioning at 20° C. and RH 65% for 24 hours and to the bursting strength test and the tensile strength test as specified in JIS (Japanese Industrial Standard) P 8112 and 8113 respectively. The results (burst factors and breaking lengths) are summarized in the following Table 2.

TABLE 2

Paper Strength-Improving Effect of Sulfonated Chitosan

| No. | Additive | Freeness (ml) | Dry Burst Factor | Dry Breaking Length (km) |
| --- | --- | --- | --- | --- |
| 1 | No additive[1] | 370 | 5.90 | 6.73 |
| 2 | Congo Red[2] | 370 | 6.06 | 6.94 |
| 3 | C-N,3,6-S[3] | 370 | 6.30 | 7.65 |
| 4 | C-3,6-S[4] | 380 | 6.40 | 7.80 |
| 5 | C-3,6-S(h)[5] | 375 | 6.60 | 8.35 |
| 6 | C-6-S[6] | 360 | 6.60 | 7.70 |
| 7 | C-6-S(h)[7] | 320 | 6.45 | 8.10 |

NOTES:
1) Control
2) Comparative Example
3) Chitosan-N,3,6-sulfate (Referential Comp. Ex.)
4) Chitosan-3,6-sulfate (Product of Ref. Ex. 1)
5) Chitosan-3,6-sulfate hydrolysate (Product of Ref. Ex. 2)
6) Chitosan-6-sulfate (Product of Ref. Ex. 3)
7) Chitosan-6-sulfate hydrolysate (Product of Ref. Ex. 4)

As shown in the results of these tests, the papers obatained by the refining with the use of sufonated chitosan exhibited higher strength than those obtained without the use thereof. In particular, chitosan-3,6-sulfonate hydrolysate which exhibited the most excellent refining assisting effect also exhibited the most excellent effect in improving the paper strength.

Recently, energy saving in production industries is required not only for reducing the production cost but also for preserving the environment of the world. Manufacturing of paper is one of the most energy-consuming industries and efforts to recycle the thermal energy in papermaking has been successfully made. The power demand for mechanical steps therein, however, has not been significantly reduced and the reduction thereof is the current problem. Refining of woodchips or pulp is one of the typical power-consuming steps and the power reduction in this step is important. With the addition of sulfonated chitosan according to the present invention, power required in the refining can be reduced by about 25% compared with the conventional refining without additives. In addition, this refining assisting additive improves paper strength. These days, shortage of pulp sources invites degradation of the quality of pulp fibers and increases the mixing rate of the broke and consequently augments the necessity of the use of additives such as paper strength resin. Under the circumstances, the use of sulfonated chitosan having refining assisting and paper strength improving effects is, not only economically but also socially, very meaningful.

What we claim is:

1. A method for reducing the power consumption needed in refining woodchips or in beating wood pulp, comprising:

selectively sulfonating chitosan at its C3 and C6 positions or at its C6 position, but not sulfonated at the C2 position, and without impairing the amino functionality of the C2 position, adding to the woodchips or the wood pulp 0.01–2.0% of said selectively sulfonated chitosan, and refining the woodchips or beating the wood pulp containing the selectively sulfonated chitosan, wherein less power is consumed during the method than when said selectively sulfonated chitosan is not present during the method.

2. The method for refining woodchips or beating pulps as claimed in claim 1, wherein the $C_3$ and $C_6$ positions of chitosan are sulfonated.

3. The method for refining woodchips or beating pulps as claimed in claim 1, wherein the $C_6$ position is sulfonated.

* * * * *